United States Patent Office

3,651,157
Patented Mar. 21, 1972

3,651,157
PROCESS FOR THE MANUFACTURE OF CARBONTETRACHLORIDE
Hans Krekeler, Wiesbaden, and Helmut Meidert, Wilhelm Riemenschneider, and Lothar Hornig, Frankfurt am Main, Germany, assignors to Farbwerke Hoechst Aktiengesellschaft vormals Meister Lucius & Bruning, Frankfurt am Main, Germany
No Drawing. Filed Oct. 8, 1968, Ser. No. 765,967
Int. Cl. C07c 17/00, 17/24
U.S. Cl. 260—664                                26 Claims

ABSTRACT OF THE DISCLOSURE

Process for the manufacture of carbon tetrachloride from benzene or mixtures of benzene and chlorinated aliphatic or aromatic compounds, or chlorinated aromatic compounds and chlorine in the absence of a catalyst in two reaction stages at temperatures within the range of from 6° to 400° C. in the first, and 400° to 800° C. in the second reaction stage and pressures within the range of from 20 to 200 atmospheres gage, the chlorine being used in an excess amount of up to 300% and the starting products being introduced together with the chlorine advantageously continuously in amounts of 0.2 to 4 moles per liter of reactor volume and per hour into a corrosion-resistant reactor.

---

The present invention relates to a process for the manufacture of carbon tetrachloride.

Carbon tetrachloride is already obtained in industry by chlorination of methane or its chlorination products or by chlorination of carbon disulfide. In the first process 4 moles hydrochloric acid are formed for each mole of carbon tetrachloride, whereby half the amount of chlorine required for the chlorination of methane is lost in the form of hydrochloric acid which is only of slight industrial interest as by-product. The second process which starts from carbon disulfide has the disadvantage that the sulfur which is formed must always be reused to render the process economic. This requires technically complicated process steps which reduce the yield, for example, the reaction of sulfur with methane and the Claus process for converting the hydrogen sulfide formed into sulfur or the reaction of sulfur monochloride with carbon disulfide.

Another known process for the manufacture of carbon tetrachloride is based on the dismutation of phosgene in 1 mole carbon tetrachloride and 1 mole carbon dioxide. This process has not gained any importance in industry because of the high cost of catalyst and the dangers involved in the handling of large amounts of toxic phosgene.

U.S. Pat. 2,854,491 describes a process for the chlorolysis of cyclic organic compounds in the presence or absence of catalysts at temperatures of above 100° C. and pressures of above 4 atmospheres. It is also mentioned in that patent that benzene can be used as starting material for the manufacture of carbon tetrachloride. No examples have been given, however, of the chlorination of benzene to carbon tetrachloride in the absence of a catalyst.

Now we have found that carbon tetrachloride can be obtained at elevated temperature and pressure in the absence of catalysts by reacting benzene, mixtures of benzene and chlorinated aromatic compounds, mixtures of benzene and chlorinated aliphatic compounds, or chlorinated aromatic compounds and chlorine in a stoichiometric proportion or with an excess amount of chlorine of up to 300% continuously in the gaseous phase to obtain carbon tetrachloride, the reaction components being passed in the first stage of the process through a prereaction zone kept at a temperature within the range of from 6° to 400° C., and being then reacted in the second stage of the process in a corrosion-resistant reactor in the gaseous phase at a temperature within the range of from 400° to 800° C. and a pressure within the range of from 20 to 200 atmospheres gage to obtain carbon tetrachloride.

The conversion of benzene to carbon tetrachloride and the space-time yield can be further increased in the process of the invention by using, per liter of reactor volume and per hour, 0.2 to 4 moles of benzene and/or mixtures of benzene and chlorinated aromatic or aliphatic compounds or chlorinated aromatic compounds, designated hereinafter starting products, and simultaneously chlorine in a stoichiometric excess of 25% to 300% calculated on the theoretically necessary amount.

The process of the invention differs from that of the above U.S. patent in that no catalyst is used for the continuous manufacture of carbon tetrachloride and in that the continuous reaction of benzene or mixtures of benzene and chlorinated aromatic compounds with chlorine in the absence of a catalyst is carried out in two reaction stages at temperatures within the range from 6° to 400° C. and 400° to 800° C., respectively, in the gaseous phase at pressures within the range from 20 to 200 atmospheres gage. Further differences are that the reaction to carbon tetrachloride may be carried out with stoichiometric amounts or excess amounts of up to 300%, preferably 25 to 300%, of chlorine and with 0.2 to 4 moles benzene or mixtures of benzene and chlorinated aromatic compounds and an excess amount of chlorine within the range of from 25 to 300%.

The process in accordance with the invention offers the industrial advance because the undesirable separation of carbon is prevented by the two-stage reaction, this enabling the continuous non-catalytic manufacture of carbon tetrachloride on an industrial scale. Another advantage of the process of the invention is that, when benzene is used exclusively, only 1 mole hydrochloric acid is formed for each mole carbon tetrachloride obtained so that the chlorine is utilized much better than in the chlorination process using methane. Furthermore, by using the prereaction zone (1st stage of the process) the pronounced exothermic reaction of the chlorination of benzene and/or the starting products takes partially place in the prereaction zone so that the heat of the total reaction can be better eliminated.

Comparison tests for the manufacture of carbon tetrachloride by chlorination of benzene were carried out in a continuously run apparatus under the conditions described in the above U.S. patent for working in the absence of a catalyst. The reaction zone was heated to 600° C., the temperature thus being within the range indicated in the said U.S. patent. It was found, however, that a non-catalyzed conversion of benzene and chlorine to carbon tetrachloride was not possible on an industrial scale in the said range of temperature. As shown in Comparison Example 1, benzene is cracked to a high extent at that temperature with formation of carbon which separates in the form of soot. Besides losses of yield, the separation of soot soon causes clogging of pipes, relief valves, manometers and similar parts of apparatus, thus rendering impossible a continuous manufacture of carbon tetrachloride. It is particularly disadvantageous because the removal of soot can only be carried out using mechanical means and is therefore time-consuming.

It is surprising that in spite of the prereaction zone the speed of formation of carbon tetrachloride is considerably higher in the process described in the invention than in the process of the above U.S. patent. In Example 1 of the U.S. patent, in which no catalyst is used, the reaction time for an extent of conversion of about 80% at 600° C. is 1 hour when hexachlorobenzene is used as starting material. Assuming the formation of hexachlorobenzene as intermediate product in the process of the invention, the total reaction could only be as fast as the slowest step of reaction. When using the prereactor under comparable conditions, the reaction time is, however, only about 20 minutes, i.e. ⅓ of the reaction time of the said U.S. patent, as is evident from Examples 1 and 2 given below. The considerably shorter reaction time offers the advantage that smaller reaction spaces are sufficient for the same amount of production.

The use in accordance with the invention of 0.2 to 4 moles benzene and/or starting products with an excess amount of chlorine of up to 300% also leads to surprising results since it would have been expected that with the same volume and construction of the reactor and the same reaction conditions an increased amount of benzene and/or starting products would lead to a reduced conversion and a smaller yield. It would be expected that owing to the shorter residence time associated with the presence of larger amounts of starting products, the equilibrium of the reaction would be shifted towards the starting materials benzene and/or starting products and chlorine and that the reaction time would no longer be sufficient for a complete chlorination of the molecules of benzene and/or starting products and consequently for a complete conversion to carbon tetrachloride. This is not the case, however, as is shown in Examples 5 to 9, this being surprising. Moreover, the high speeds with which the starting substances are fed to the prereaction zone enable a better and more constant adjustment of the required reaction temperatures. The upper limit of the amount of benzene and/or starting products to be used per liter of reactor volume an hour is about 4 moles. The upper limit cannot be given absolutely exacly for all posible variations of the process of the invention because it depends essentially on the construction of the reactor and the speed of elimination of the heat of reaction. The heat of reaction must be eliminated so rapidly by appropriate known measures that overheating of the reactants and the reaction products and damages to the material of which the reactor has been made are avoided. It is especially advantageous to use a long tubular reactor of heat-resistant steel, lined with a corrosion-resistant material, and which may consist of a single flow tube.

The temperature in the prereaction zone should be within the range of from 6° to 400° C., advantageously 250° to 350° C. The lower temperature limit is given by the melting point of the benzene, the chlorinated aromatic compounds or the mixtures of benzene and starting products. When, for example, hexachlorobenzene is used, a temperature of at least 228° C. is required in the prereaction zone. The upper temperature limit of about 400° C. is determined by the beginning cracking of the benzene and/or starting products introduced together with the chlorine. The reaction components chlorine and benzene and/or starting products are advantageously introduced in the liquid form into the prereactor by a pump. The reaction components may either be mixed while cold, for example at room temperature, before the prereactor or only in the prereactor. Concerning the lower temperature limit it should be pointed out that when the two reactants benzene and chlorine are introduced into the reactor without special preheating, they must be passed through a heating zone having a temperature of, for example, 6° to 250° C. This short heating zone between the site of mixing and a temperature of 225° C. is defined to be part of the prereactor. It is also possible, however, to omit a mixing zone arranged before the prereactor and to mix the benzene and chlorine by known measures, for example with the help of installations inside the prereactor. It is furthermore possible to mix the reaction components in the gaseous form after they have been preheated separately and then to introduce them into the prereactor. When mixtures of benzene and/or starting products are used, the components are advantageously mixed before being introduced into the prereactor, if the benzene content is small. It is also possible, however, to introduce the components separately into the prereactor, this mode of proceeding being preferably used when the benzene content of the mixture is relatively large.

The prereaction zone may be constructed in various ways. There may be used, for example, a tube or a pipe coil disposed close to the reactor and heated outside the reactor to the desired temperature by a special heating device, for example with the help of high pressure steam, an oil- or salt bath or by electrical heating. The prereaction zone may likewise be arranged in the form of a tube or pipe coil in the reactor itself, this being particularly advantageous in view of the favourable utilization of the heat of reaction and the additional possibilities of controlling it. The reactor proper may also be constructed so as to be somewhat larger and the first part of it may be used as prereactor by maintaining it at the said temperature within the range of from 6° to 400° C. It is also possible to dispose the prereaction zone at the outlet of the reactor, to cool the reaction product with the help of a counter-current heat exchanger and simultaneously to preheat the reaction components chlorine and benzene or mixtures of benzene and/or starting products. Further modes of constructing the prereaction zone for maintaining the desired temperature range and mixing the benzene and/or starting products and chlorine are also possible.

The quantitative ratio of the starting substances chlorine and benzene is determined by the following reaction scheme

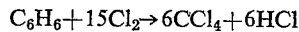

if benzene is used exclusively. In this case the amounts used should correspond to the stoichiometric amounts of the above reaction scheme, a small excess of chlorine of up to about 25 mol percent being advantageous. By the theoretically necessary amount of chlorine there is meant, according to the above reaction scheme, the amount of 15 moles chlorine for one mole benzene which is stoichiometrically necessary for the quantitative conversion of benzene to carbon tetrachloride. When proceeding in this manner it is not possible, however, to obtain a 100% conversion of benzene to carbon tetrachloride under technically justifiable working conditions, as shown in Examples 1 and 2, because certain amounts of by-products are always formed. There should especially be mentioned the formation of hexachlorobenzene; other by-products, for example hexachlorethane, perchlorethylene and trichlorethylene, are also formed in small amounts.

The above by-products may be separated by distillation, returned to the reactor and converted to carbon tetrachloride, which requires, however, additional technical expenditure. Of the chlorinated by-products, hexachlorobenzene is particularly annoying as it readily deposits on the walls of the pipes, the valves and manometers because of its high melting point of 227° C. and its good sublimation properties and may thus cause annoying interruptions.

To avoid or reduce the formation of by-products, the chlorine is used with respect to the benzene in an excess amount of 25 to 300%, preferably 50 to 150%, of the amount theoretically required for the conversion to carbon tetrachloride. By an excess amount of chlorine of 25% there is meant an amount of 18.75 moles chlorine for one mole benzene and by an excess amount of chlorine of 300% there is meant an amount of 45 moles chlorine for one mole benzene.

The upper limit of the excess amount of chlorine is determined by a reduction of the space-time yield because the chlorine which does not participate in the reaction occupies reaction space and may therefore not only act as diluent but may also reduce the residence time to below a tolerable limit.

In the process of the invention for the manufacture of carbon tetrachloride there may also successfully be used, instead of benzene, mixtures of benzene and chlorinated aliphatic or aromatic compounds, or chlorinated aromatic compounds having up to 12 carbon atoms, as shown in Examples 10 to 23. Even when very stable aromatic compounds, for example highly chlorinated diphenyls, are used, the speed of formation of carbon tetrachloride is only insignificantly reduced as compared with the exclusive use of benzene as starting substance. By raising the temperature to up to 750° C., increasing the residence time to more than 20 minutes, increasing the excess amount of chlorine to up to 300% or varying several of these reaction conditions, very stable aromatic mono- or polychlorinated compounds can be converted to carbon tetrachloride in a smooth reaction with an extent of conversion of above 80% and a yield of over 90%. The ratio of benzene to chlorinated aromatic compounds may vary within the range of from 1:99 to 99:1% by weight. There are advantageously used mixtures of benzene and chlorinated aromatic compounds in a ratio within the range of from 5:95 to 20:80% by weight.

As chlorinated aromatic compounds there may be used monochlorobenzene, dichlorobenzenes, trichlorobenzenes, tetrachlorobenzenes, pentachlorobenzenes, hexachlorobenzene, mono- or poly-chlorinated naphthalenes, anthracenes, phenanthrenes, highly condensed aromatic compounds to which alicyclic radicals have been linked by condensation, mono- or polychlorinated diphenyls, triphenyls, compounds substituted by several phenyl groups, and aromatic compounds with aliphatic side chains, which are mono- or poly-chlorinated in the nucleus and/or the side chain.

Such compounds can be obtained by known processes, for example by oxychlorination of aromatic substances. By catalytic reaction of benzene with oxygen and hydrochloric acid there is obtained, for example, a mixture of monochlorobenzene, dichlorobenzenes and trichlorobenzenes. Depending on the working conditions, higher degrees of chlorination may also be obtained in the oxychlorination of benzene or other aromatic substances. The chlorine introduced into the aromatic substances by this method stems from the hydrochloric acid obtained as by-product, for example, in the manufacture of carbon tetrachloride from benzene or the chlorination of aromatic or aliphatic substances, and can thus be utilized. The use of mixtures of chlorinated aromatic compounds and benzene is of considerable technical and economical importance. Compounds obtained as by-products in the chlorination of aromatic compounds can thus be converted into technically valuable carbon tetrachloride. The chlorinated aromatic compounds to be used in the process of the invention may also be chlorination residues which are obtained as by-products in chlorination reactions and are available as waste or residual products after separation of the main product or products.

Instead of mixtures of benzene and chlorinated aromatic compounds there may also be used as starting products for the process of the invention mixtures of benzene and chlorinated aliphatic compounds. It was surprising that the reaction of these starting products with chlorine to carbon tetrachloride proceeds smoothly as shown in Examples 24 to 27. The reaction of unsaturated chlorinated aliphatic compounds which is generally very violent and often associated with the formation of carbon can be retarded by the process of the invention and these substances can be converted into carbon tetrachloride in a smooth reaction. The reaction speed of highly chlorinated aliphatic compounds such as hexachlorethane and perchlorobutane which are otherwise very stable with respect to further chlorinations can, on the other hand, be increased by the addition of benzene. Furthermore, particularly the higher chlorinated aliphatic compounds have only a relatively small positive heat of formation in the chlorination so that the heat radiated by the reactor is larger than the heat of formation of carbon tetrachloride. In such cases, the mixture of chlorinated aliphatic compounds with benzene compensates the formation of heat of the reactor because benzene gives off a larger amount of heat in the perchlorination than the higher chlorinated aliphatic compounds.

The ratio of benzene to chlorinated aliphatic compounds may vary within wide limits, contamination of the benzene with chlorinated aliphatic compounds or contamination of the chlorinated aliphatic compounds with benzene being included. The impurities may amount to 1% and the accuracy with which they can be analytically determined may clearly vary in the case of such a mixture of substances. Advantageously, 2 to 22% benzene is admixed with the chlorinated aliphatic compounds or mixtures of several chlorinated aliphatic compounds.

As chlorinated aliphatic compounds having up to 4 carbon atoms there may be used methylchloride, methylene chloride, chloroform, chloracetylenes, vinyl chloride, di-, tri- and tetrachlorethylene, mono-, di-, tri-, tetra-, penta- and hexachlorethanes, mono, poly- and perchlorinated propanes and propenes, butanes, butenes and butadienes, derivatives of higher aliphatic alkanes, alkenes, polyalkenes and alkines with chlorine, and mono-, poly- or perchlorinated cycloaliphatic compounds, for example, hexachlorocyclohexane.

The temperature in the prereaction zone should be somewhat above the melting point of the mixture of benzene and chlorinated aliphatic compounds used. The temperature in the main reaction zone may generally be somewhat lower, for example by 50° C., than when pure benzene is used. The rest of the reaction conditions for the reaction of mixtures of benzene and chlorinated aliphatic compounds being the same as those indicated above.

The process of the invention is also applicable to mixtures of any chlorinated aliphatic or aromatic compounds which need not meet any special requirements of purity except that the sulfur content must be below 200 milligrams/kilogram. When mixtures of benzene and chlorinated aliphatic compounds are used, small amounts of impurities, for example, ethers, aldehydes, alcohols, carboxylic acids or acetates do not interfere with the reaction.

The pressure under which the reaction of benzene and/or starting products with chlorine to carbon tetrachloride is carried out should be within the range of from 20 to 200 atmospheres gage, preferably 60 to 120 atmospheres gage. The pressure is produced by the temperature and by the introduction of the reaction components with the help of a pump and is kept constant by means of a relief valve when working continuously. The pressure in the prereactor should correspond to about that of the main reactor.

The temperature in the reactor (2nd stage of process) should be within the range of from 400° to 800° C., preferably 560° to 620° C. The reactor may be heated in known manner, preferably electrically or with hot combustion gases. When the prereactor and the reactor are sufficiently large, the liberation of heat will be sufficient for maintaining the reaction temperature. It may be possible that the desired reaction temperature must be kept constant by additional cooling.

Although the two starting components benzene and/or starting products and chlorine may be introduced into the reactor in the liquid state the reaction proper takes place in the gaseous phase. At the indicated reaction temperatures within the range of from 400° to 800° C. all starting substances as well as the end product carbon tetrachloride are in an above-critical, i.e. gaseous state. Hexachlorobenzene which may possibly be formed as intermediate product is also in vapour form, corresponding to its partial pressure.

As material for the reactor and prereactor, nickel has proved resistant to the high strain of corrosion by chlorine and hydrochloric acid at temperatures of about 600°

C., pure nickel being preferably used. Steels having a high content of nickel and special alloys may, however, also be used. The pressure exerted on the reactor at the high temperatures is absorbed by a jacket of high-temperature resistant steel.

In the process of the invention the reaction of benzene and/or starting products with chlorine should be carried out continuously. The chlorine that has not been consumed may be recycled after separation of carbon tetrachloride and complete or partial separation of hexachlorobenzene which may possibly form and other by-products which may have formed, and then reused. The hexachlorobenzene which may possibly be formed in small amounts may be used again and can be quantitatively converted to carbon tetrachloride under the indicated conditions of temperature and pressure.

The following examples serve to illustrate the invention, but are not intended to limit it.

COMPARISON EXAMPLE 1

The reactor consisted of a 5-litre autoclave of stainless steel lined with pure nickel sheet. To facilitate guidance of flow, flow baffle plates of nickel were built in. The reactor was heated by electric jacket heating to 580° C. determined on the outside of the reactor. An internal thermoelement of the reactor indicated a temperature of 600° C. Into the head of the reactor chlorine was introduced through one inlet opening and benzene through the other inlet opening by means of a pump. For introducing the chlorine a diaphragm plunger pump with cooled head was used while the benzene was introduced by a common reciprocating pump. The lower end of the reactor was provided with a relief valve of nickel to maintain the pressure in the reactor at 60 atmospheres gage. The gases relieved from pressure were cooled and condensed first in a separator working without pressure and then in cooling traps.

Charge of benzene per hour 78 grams=1 mole
Charge of chlorine per hour 1200 grams=17 moles After a working time of 20 minutes the relief valve was clogged with soot and the test had to be interrupted. The yield cannot therefore be indicated.

EXAMPLE 1

The apparatus was the same as the one used in Comparison Example 1. Additionally a pipe coil of pure nickel having a length of 4.20 m. and an inside diameter of 15 mm. was disposed before the reactor such that the end of the coil opened directly into the head of the reactor. This prereaction zone was kept at 250° C. by means of an oil bath. The two reaction components chlorine and benzene were introduced by a pump, instead of into the head of the reactor, into the nickel coil at the beginning of the prereaction zone. The internal temperature of the reactor was 580 to 600° C.

Charge of benzene per hour 78 grams=1 mole
Charge of chlorine per hour 1200 grams=17 moles The test was interrupted after 8 hours. 5620 grams carbon tetrachloride were isolated, corresponding to 76% of the theoretical. The proportion of benzene that had not been converted to carbon tetrachloride was mainly present as hexachlorobenzene. The benzene had been reacted quantitatively. The space-time yield was 140 grams carbon tetrachloride per liter of reactor volume and per hour. The residence time in the reactor was 17.9 minutes, assuming that a 100% conversion to carbon tetrachloride had taken place. The residence time in the prereaction zone was 3.5 minutes, assuming that the components did not react with one another,

EXAMPLE 2

By working in the apparatus described in Example 1, introducing, per hour, 78 grams=1 mole benzene and 1275 grams=18 moles chlorine into the prereactor and applying a pressure of 80 atmospheres gage and an internal temperature of 580° to 600° C., the yield of carbon tetrachloride was increased to 5920 grams=80.2% of the theoretical.

COMPARISON EXAMPLE 2

As reactor a vertically arranged tube of high temperature steel lined with nickel was used. The tube had a length of 3300 mm. and an inside diameter of 52 mm. The reaction components chlorine and benzene were fed at room temperature by a pump to the lower end of the reactor. The mixture of reaction gases was removed at the head of the reactor. In this place a relief valve was disposed with the help of which the pressure in the reactor was kept at 80 atmospheres gage. The released reaction gases were cooled and condensed first in separators working without pressure and then in cooling traps. The reactor was heated by two electric jacket heatings. The lower jacket heating extending to a height of 1 m. was heated to a temperature of at most 250° C.; the temperature was measured with an internal thermoelement. This zone comprising a reactor volume of 2 liters was the prereaction zone. The upper jacket heating was adjusted such that the internal temperature of the reactor was 600° C.; this zone comprising a reactor volume of 5 liters constituted the main reactor. The apparatus was charged with:

Benzene 78 grams=1 mole per hour
Chlorine 1140 grams=16.1 moles per hour (excess amount of about 7%)

The test was interrupted after 5 hours. In addition to HCl which had escaped and chlorine in excess, which both entrained a small amount of carbon tetrachloride, there were collected:

3660 grams $CCl_4$=79.3% of the theoretical
260 grams hexachlorobenzene
11 grams hexachlorethane
3 grams tetrachlorethylene The space-time yield was calculated as 147 grams carbon tetrachloride per liter of reaction space and per hour.

EXAMPLE 3

The test was carried out using the apparatus and the reaction conditions described in Comparison Example 2. There were used:

Benzene 78 grams=1 mole per hour
Chlorine 1700 grams=24 moles per hour (excess amount of 60%)

After working for 5 hours a condensate was obtained which contained:

4040 grams $CCl_4$=87.5% of the theoretical
149 grams hexachlorobenzene
0 gram hexachlorethane
0 gram tetrachlorethylene.

The space-time yield was calculated as 162 grams $CCl_4$ per liter of reaction space and per hour.

EXAMPLE 4

The test was carried out using the apparatus and the conditions of Comparison Example 2 and Example 3. The charge was as follows:

Benzene 78 grams=1 mole per hour
Chlorine 2270 grams=32 moles per hour (excess amount of 113%)

During a working time of 5 hours there were collected:

4180 grams $CCl_4$=90.8% of the theoretical
115 grams hexachlorobenzene
0 gram hexachlorethane
0 gram tetrachlorethylene The space-time yield was calculated as 168 grams CCl$_4$ per liter of reaction space and per hour.

EXAMPLES 5 TO 9

The tests were carried out in the apparatus described in Comparison Example 2.

| Example No. | Mole benzene per liter reaction space | Temperature, °C. | Excess of chlorine, mole percent | Conversion, percent | Space-time yield, g./l.h. |
|---|---|---|---|---|---|
| 5 | 0.2 | 600 | 60 | 87.5 | 162 |
| 6 | 0.3 | 600 | 60 | 90.4 | 250 |
| 7 | 0.4 | 600 | 60 | 91.8 | 339 |
| 8 | 0.8 | 600 | 60 | 93.1 | 688 |
| 9 | 2.0 | 680 | 60 | 97.2 | 1,795 |

In Example 9, the reaction to carbon tetrachloride was carried out at a higher temperature so that the increased extent of conversion cannot be exactly compared with the values of Examples 1 to 4. Example 5 is a comparison example to Example 3.

EXAMPLE 10

As reactor a vertically arranged tube of high temperature steel lined with nickel was used. The tube had a length of 3300 mm. and an inside diameter of 52 mm. The reaction components chlorine, benzene and/or starting products were introduced at room temperature into the lower end of the reactor by a pump. The mixture of reaction gases was withdrawn at the head of the reactor. In this place a relief valve was disposed in order to maintain the pressure in the reactor at 80 atmospheres gage. The reaction gases relieved from pressure were cooled and condensed first in separators operated without pressure and then in cooling traps. The reactor was heated by two electric jacket heatings. The lower jacket heating extending to a height of about 1000 mm. was heated to a temperature of at most 250° C.; the temperature was measured with an internal thermoelement. This zone comprising a reactor volume of about 2 liters was the prereaction zone. The upper jacket heating having a length of 2300 mm. was adjusted such that the internal temperature of the reactor was 660° C.; this zone comprising a reactor volume of 4.6 liters constituted the main reactor.

The apparatus was charged per hour with 763 grams of a mixture of:

1.1% benzene
82.3% monochlorobenzene
4.6% o-dichlorobenzene
11.6% m+p-dichlorobenzene
0.1% trichlorobenzenes
12 kg. chlorine Assuming a mean molecular weight of the chlorinated aromatic compounds of 118, 1.3 moles had been introduced per liter of reaction space and per hour; the molar excess of chlorine was 88% of the theoretically required amount of chlorine. After a time of reaction of about 3 hours, the conditions of temperature and flow in the reactor were constant. The reaction products were condensed in the collecting vessels and cooling traps with the exception of the hydrochloric acid. By distilling off the chlorine in excess, which could be done continuously, there were obtained, per hour, 5640 grams carbon tetrachloride
98 grams hexachlorobenzene This corresponded to an extent of conversion to carbon tetrachloride of 94.7% and to hexachlorobenzene of 5.3%. The space-time yield was 1227 grams carbon tetrachloride per liter of reaction space and per hour.

EXAMPLE 11

In the apparatus described in Example 10 and under the same conditions of pressure and temperature there were used, per hour, 735 grams of a mixture of:

14.20% monochlorobenzene
27.00% o-dichlorobenzene
0.03% m-dichlorobenzene
47.60% p-dichlorobenzene
10.80% sum of trichlorobenzenes
0.40% sum of tetrachlorobenzenes
7.4 kg. chlorine Assuming a mean molecular weight of the mixture of 147, 1.1 moles were introduced per liter of reaction space. The molar excess of chlorine was 61%. The reaction products were collected as described in Example 1.

There were obtained, per hour, 4280 grams carbon tetrachloride corresponding to a yield of 92.8%
99 grams hexachlorobenzene corresponding to a yield of 7.0%

The space-time yield was 932 grams carbon tetrachloride per liter of reaction space and per hour.

EXAMPLE 12

In the apparatus described in Example 10 and under the same conditions of pressure, but at an internal temperature of 600° C. there were used, per hour, 4 grams (~0.05 mole) benzene
141 grams (0.95 mole) o-dichlorobenzene
1167 grams chlorine (excess amount of 45%)

In the manner described in Example 10, 840 grams carbon tetrachloride (yield 91%) and 26 grams hexachlorobenzene (yield 9%) were obtained. The space-time yield was 183 grams carbon tetrachloride per liter and per hour.

EXAMPLE 13

The test was carried out as described in Example 12, but while using instead of o-dichlorobenzene, the same amount in moles (0.95 mole=205 grams) 1,2,4-trichlorobenzene.

There was obtained:

824 grams carbon tetrachloride corresponding to a yield of 89.3%
29 grams hexachlorobenzene corresponding to a yield of 10.3%

The space-time yield was 179 g./l. h.

EXAMPLE 14

In the apparatus of Example 10 and under the same conditions of pressure, but at a temperature of 680° C. there were used, per hour, 1106 grams of a mixture of:

5.5% benzene
94.5% monochlorobenzene
14.5 kg. Cl$_2$ (excess amount of 45%)

8460 grams carbon tetrachloride were obtained per hour, which corresponded to an extent of conversion of 91.7%. The space-time yield was 1840 g./l. h.

EXAMPLE 15

Under the conditions described in Example 14 there were used, per hour, 1056 grams of a mixture of:

20% benzene and
80% monochlorobenzene
14.5 kilograms chlorine (excess amounts of 41%)

8760 grams carbon tetrachloride were obtained per hour, corresponding to an extent of conversion of 94.8%. The space-time yield was 1905 g./l. h.

EXAMPLE 16

The test was carried out in the apparatus and under the pressure conditions described in Example 10, while using a temperature of 640° C. There were used, per hour, 726 grams of a mixture of:

50% hexachlorobenzene
50% benzene which was kept liquid at 150° C. and was introduced into the reactor at that temperature, and 6.2 kilograms chlorine (excess amount of 82%).

There were obtained, per hour, 3280 grams carbon tetrachloride, corresponding to an extent of conversion of 88.6%, and 119 grams hexachlorobenzene, corresponding to an extent of conversion of 10.5%. The space-time yield was 714 g./l. h.

EXAMPLE 17

In the apparatus and under the pressure described in Example 10 there were used, per hour, at an internal temperature of the reactor of 700° C.

223 grams dichlorodiphenyl (a commercial mixture of different isomers containing also 3 to 4% trichlorodiphenyl)
39 grams benzene
3.2 kilograms chlorine (excess amount of 30%)

2198 grams carbon tetrachloride were obtained, which corresponded to a yield of 95.2%. The space-time yield was 478 g./l. h.

EXAMPLE 18

In the apparatus and under the pressure described in Example 10 there were used, per hour, at an internal temperature of the reactor of 650° C.

396 grams 1,2-dichloronaphthalene heated to 50° C.
78 grams benzene
8.5 kilograms chlorine (excess amount of 105%)

3768 grams carbon tetrachloride were obtained, which corresponded to a yield of 94.1%. The space-time yield was 316 g./l. h.

EXAMPLE 19

In the apparatus and under the pressure described in Example 10 there were used, per hour, at an internal temperature of the reactor of 630° C.

506 grams benzyl chloride
78 grams benzene
11.7 kilograms chlorine (excess amount of 97%)

There were obtained 4800 grams carbon tetrachloride, corresponding to an extent of conversion of 91.6%, and 86 grams hexachlorobenzene, corresponding to an extent of conversion of 6.0%.

EXAMPLE 20

By proceeding as described in Example 19, but using, instead of benzyl chloride, the same amount of p-chlorobenzyl chloride, 3950 grams carbon tetrachloride were obtained, which corresponded to an extent of conversion of 92.1%. The space-time yield was 858 g./l. h. As by-product hexachlorobenzene was obtained.

EXAMPLE 21

In the apparatus and under the pressure described in Example 10 there were used, per hour, at an internal temperature of the reactor of 650° C.

535 grams of a mixture of:

92.5% benzene
6.1% monochlorobenzene
1.4% p-dichlorobenzene
13.0 kilograms chlorine (excess amount of 84%)

By working up as described in Example 10 there were obtained, per hour, 5930 grams carbon tetrachloride and 65 grams hexachlorobenzene corresponding to a yield of carbon tetrachloride of 96.2% calculated on the mixture used as starting material. The space-time yield was 1200 g./l. h.

EXAMPLE 22

In the apparatus and under the reaction conditions described in Example 10 there were used, per hour.

450 grams monochlorobenzene
6.4 kilograms chlorine (excess amount of 61%)

By working up as described in Example 10 there were obtained, per hour, 3450 grams carbon tetrachloride corresponding to a yield of 93.4%. 6.2% of the monochlorobenzene were reacted to hexachlorobenzene (71 grams). The space-time yield was 750 g./l. h.

EXAMPLE 23

In the apparatus and under the pressure described in Example 10 there were used, per hour, at an internal temperature of the reactor of 600° C.

282 grams (1.9 moles) o-dichlorobenzene
2340 grams chlorine (excess amount of 34%)

By working up as described in Example 10 there were obtained 1600 grams carbon tetrachloride, corresponding to a yield of 91% and 48 grams hexachlorobenzene corresponding to a yield of 8.9%, calculated on the dichlorobenzene used.

EXAMPLE 24

As reactor a vertically arranged tube of high temperature steel lined with nickel was used. The tube had a length of 3300 mm. and an inside diameter of 52 mm. The reaction components chlorine and organic compounds were introduced at room temperature into the lower end of the reactor by a pump. The mixture of reaction gases was withdrawn at the head of the reactor. In this place a relief valve was disposed with the help of which the pressure in the reactor was kept at 80 atmospheres gage. The reaction gases which had been relieved from pressure were cooled and condensed first in separators operated without pressure and then in cooling traps. The reactor was heated by two electric jacket heatings. The lower jacket heating extending to a height of 1000 mm. was heated to a temperature of at most 250° C.; the temperature was measured with an internal thermoelement. This zone comprising a reactor volume of 2 liters was the pre-reaction zone. The upper jacket heating was adjusted such that the internal temperature of the reactor was 590° to 600° C.; this zone comprising a reactor volume of 4.6 liters constituted the main reactor.

Into this apparatus there were introduced, per hour, 988 grams of a mixture of:

5.0% benzene
9.5% carbon tetrachloride
60.8% hexachlorethane
1.9% pentachlorethane
18.0% tetrachlorethylene
4.8% trichlorethylene which was kept at 75° C. to prevent crystallization, and 1.4 kilograms chlorine (excess amount of 28%).

After reacting for 5 hours, the conditions of temperature, pressure and flow in the reactor were constant. The hexachlorobenzene was separated in a separator working without pressure and constructed as an empty 10-liter vessel without special cooling. Carbon tetrachloride, chlorine and traces of hexachlorobenzene were separated in six cooling traps connected in series and cooled to about −60° C. The hydrogen chloride was not condensed. By distilling off the chlorine in excess, which could be done continuously, there were obtained, per hour, together with the product from the separator:

1840 grams carbon tetrachloride
27 grams hexachlorobenzene

The space-time yield was 400 grams carbon tetachloride per liter of reaction space and per hour. Since the by-product hexachlorobenzene can only stem from the addition of benzene, the benzene had been converted to an extent of 85% into carbon tetrachloride. The extent of conversion of the chlorinated hydrocarbons into carbon tetrachloride was substantially 100%.

EXAMPLE 25

In the apparatus and under the reaction conditions described in Example 24 there were used, per hour, 5250 grams of a mixture of:

13.8% benzene
16.2% carbon tetrachloride
42.2% hexachloroethane
1.1% pentachlorethane
22.7% tetrachlorethylene
4.0% trichlorethylene which was kept at 50° C. and 18.3 kilograms chlorine (excess amount of 53%).

By working up as described in Example 1 there were obtained:

8780 grams carbon tetrachloride
1940 grams hexachlorobenzene

The space-time yield was 1910 grams carbon tetrachloride per liter of reaction space and per hour. The yield was 100% calculated on the chlorinated hydrocarbons. The extent of conversion of benzene to carbon tetrachloride was 26.6%; 73.4% had been converted to hexachlorobenzene, which could be returned to the reaction.

EXAMPLE 26

In the apparatus and under the reaction conditions described in Example 24 there were used, per hour, 1520 grams of a mixture of:

20% benzene
40% 1,2-dichloroethane
40% 1,1,2-trichloroethane
11.0 kilograms chlorine (excess amount of 44%)

By working up as described in Example 24 there were obtained:

6020 grams carbon tetrachloride
267 grams hexachlorobenzene

This corresponds to a space-time yield of 1310 g./l. h., an extent of conversion of the chlorinated aliphatic compounds of 100% and an extent of conversion of benzene to carbon tetrachloride of 76.0%.

EXAMPLE 27

In the apparatus and under the pressure described in Example 24 there were used, per hour, at a temperature of 650° C., 810 grams of a mixture of:

75% benzene
25% hexachlorocyclohexane (mixture of isomers containing a small amount of the γ-form) which was kept at 70° C.
17.5 kilograms chlorine (excess amount of 97%)

By working up as described in Example 24 there were obtained:

7200 grams carbon tetrachloride
193 grams hexachlorobenzene

This corresponded to a space-time yield of 1565 g./l. h. and an extent of conversion of the mixture to carbon tetrachloride of 91.9% and to hexachlorobenzene of 8.0%.

What is claimed is:
1. A process for the manufacture of carbon tetrachloride at elevated temperature and pressure in the absence of catalysts which comprises reacting
(a) benzene;
(b) mixtures of benzene and a chlorinated aromatic hydrocarbon compound with up to 12 carbon atoms;
(c) mixtures of benzene and a chlorinated aliphatic hydrocarbon compound with up to 4 carbon atoms or chlorinated cyclohexane, or
(d) a chlorinated aromatic hydrocarbon compound selected from the group consisting of monochlorobenzene, dichlorobenzene, trichlorobenzene, tetrachlorobenzene, pentachlorobenzene, hexachlorobenzene; a monochlorinated naphthalene, anthracene, and phenanthrene; a polychlorinated naphthalene, anthracene, and phenanthrene; a monochlorinated diphenyl and triphenyl; and a polychlorinated diphenyl and triphenyl and chlorine in stoichiometric proportions or with an excess amount of chlorine of up to 300% continuously in the gaseous phase to obtain carbon tetrachloride, the reaction components being passed in a first process stage through a prereaction zone kept at temperatures within the range of from 6° to 400° C., and being then reacted in a second process stage in a corrosion-resistant reactor in the gaseous phase at temperatures within the range of from 400° to 800° C. and pressures within the range of from 20 to 200 atmospheres gage to obtain carbon tetrachloride.

2. The process of claim 1 wherein the chlorine is used in an excess amount of up to 25% calculated on the theoretically required amount.

3. The process of claim 1 wherein the chlorine is used in an excess amount of 50 to 150% calculated on the theoretically required amount.

4. The process of claim 1 wherein the temperature in the first process stage is within the range of from 250° to 350° C.

5. The process of claim 1 wherein the temperature in the second process stage is within the range of from 560° to 620° C.

6. The process of claim 1 wherein the reaction to carbon tetrachloride is carried out at pressures within the range of from 60 to 120 atmospheres gage.

7. The process of claim 1 wherein there are used 0.2 to 4 moles benzene and/or starting products per liter of reactor volume and per hour and chlorine in an excess amount of 25 to 300% calculated on the theoretically required amount.

8. The process of claim 1 wherein there are used 1.3 to 2.0 moles benzene and/or starting products per liter of reactor volume and per hour and chlorine in an excess amount of 25 to 300% calculated on the theoretically required amount.

9. The process of claim 1 wherein the ratio of benzene to chlorinated aromatic compounds in the mixtures is within the range of from 1:99 to 99:1% by weight.

10. The process of claim 1 wherein the ratio of benzene to chlorinated aromatic compounds in the mixtures is within the range of from 5:95 to 20:80% by weight.

11. The process of claim 1 wherein the ratio of benzene to chlorinated aliphatic compounds in the mixtures is within the range of from 2:98 to 20:80% by weight.

12. The process of claim 1 wherein the chlorinated aromatic compound is monochlorobenzene.

13. The process of claim 1 wherein the chlorinated aromatic compound is p-dichlorobenzene.

14. The process of claim 1 wherein the chlorinated aromatic compound is hexachlorobenzene.

15. The process of claim 1 wherein the chlorinated aromatic compound is 1,2-dichloronaphthalene.

16. The process of claim 1 wherein the chlorinated aromatic compound is benzyl chloride.

17. The process of claim 1 wherein the chlorinated aliphatic compound is dichlorethylene.

18. The process of claim 1 wherein the chlorinated aliphatic compound is trichlorethylene.

19. The process of claim 1 wherein the chlorinated aliphatic compound is tetrachlorethylene.

20. The process of claim 1 wherein the chlorinated aliphatic compound is monochlorethane.

21. The process of claim 1 wherein the chlorinated aliphatic compound is dichlorethane.

22. The process of claim 1 wherein the chlorinated aliphatic compound is trichlorethane.

23. The process of claim 1 wherein the chlorinated aliphatic compound is tetrachlorethane.

24. The process of claim 1 wherein the chlorinated aliphatic compound is pentachlorethane.

25. The process of claim 1 wherein the chlorinated aliphatic compound is hexachlorethane.

26. The process of claim 1 wherein the chlorinated aliphatic compound is hexachlorocyclohexane.

References Cited

UNITED STATES PATENTS

| | | | |
|---|---|---|---|
| 2,854,491 | 9/1958 | Kung | 260—662 R |
| 2,898,384 | 8/1969 | Viriot | 260—658 R |

OTHER REFERENCES

Mamedaliev et al., Chem. Abstracts 60, 10448h–10449a (1964).

Hoechst, Chem. Abstracts 64, 3350 (1966).

Halcon Int. Chem. Abstracts 67, 73130K (1967).

Obrecht et al., Chem. Abstracts 69, 105864n (1968).

DANIEL D. HORWITZ, Primary Examiner

U.S. Cl. X.R.

260—650 R, 654 H, 652 R

UNITED STATES PATENT OFFICE
CERTIFICATE OF CORRECTION

Patent No. 3,651,157　　　　　　　　Dated　March 21, 1972

Inventor(s) Krekeler, Meidert and Riemenschneider

It is certified that error appears in the above-identified patent and that said Letters Patent are hereby corrected as shown below:

In the Heading:

After "Ser. No. 765,967" insert --; claims priority of applications in Germany,

October 13, 1967　- P 16 68 030.1

December 23, 1967 - P 16 68 064.1

June 22, 1968　　 - P 17 68 727.3

July 15, 1968　　 - P 17 68 931.5

August 7, 1968　　- P 17 93 131.6

Signed and sealed this 11th day of July 1972.

(SEAL)
Attest:

EDWARD M. FLETCHER, JR.　　　　　ROBERT GOTTSCHALK
Attesting Officer　　　　　　　　Commissioner of Patents